A. REASON.
SUPPORTS FOR TUMBLING RODS FOR THRASHERS.
No. 181,595. Patented Aug. 29, 1876.
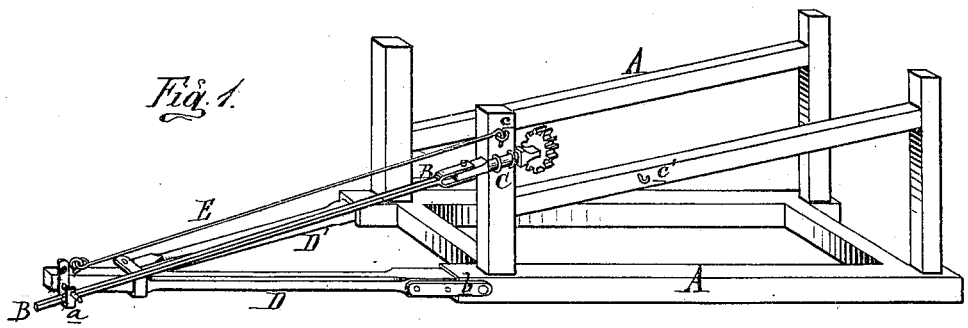
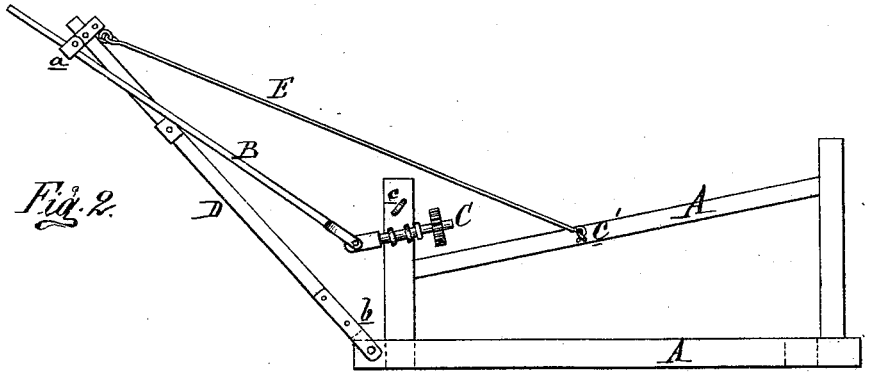
Attest:
Edward Barthel.
Charles J. Hunt
Inventor:
A. Reason
By Atty
Pht. S. Sprague

UNITED STATES PATENT OFFICE.

ALBERT REASON, OF PINCKNEY, MICHIGAN.

IMPROVEMENT IN SUPPORTS FOR TUMBLING-RODS FOR THRASHERS.

Specification forming part of Letters Patent No. 181,595, dated August 29, 1876; application filed June 6, 1876.

*To all whom it may concern:*

Be it known that I, ALBERT REASON, of Pinckney, in the county of Livingston and State of Michigan, have invented an Improved Support for the Tumbling-Rods of Thrashers, of which the following is a specification:

The object I have in view is to obviate the necessity of staking down a bearing for the tumbling-rod which communicates motion from a horse-power to a thrashing-machine, by attaching a supporting-frame carrying a bearing for the tumbling-rod directly to the main frame of the machine, and in such a manner that said supporting-frame and the tumbling-rod can be tilted or folded up behind the machine for transportation with the latter.

Figure 1 is a perspective view, showing my improvement applied to the main frame of a thrashing-machine, in position to couple with a horse-power lying on the ground. Fig. 2 is a side elevation, showing the tumbling-rod hooked up for transportation.

In the drawing, A represents the main frame of a thrashing-machine, and B the tumbling-rod, by means of which power and motion are conveyed from a horse-power staked on the ground to the working mechanism through the driving-shaft C, journaled at the side of the frame.

Heretofore it has been necessary to stake a bearing upon the ground near the universal joint which couples the tumbling-rod to the motor, to support the former in its proper position. In lieu thereof I place the bearing in a bracket-hanger, $a$, at the side of a bar, D, at the outer end thereof, the inner of which rod is hinged, through a heel-plate, $b$, to one of the lower corners of the frame A, and is kept in line with said frame by a diagonal brace, D′, hinged in like manner to the other side of said main frame.

E is a rod, fastened by an eyebolt to the outer end of the bar D, with a hook turned in its free end, which engages with a staple, $c$, on the side of the frame A, to lock the said bar in its lowered or working position, as seen in Fig. 1, or into another staple, $c'$, to sustain it in its elevated position, as seen in Fig. 2.

What I claim as my invention is—

The combination, with the main frame A and the driving-shaft C of a thrashing-machine, of the bar and brace D D′, hinged to the said frame, the bearing $a$ for the tumbling-rod, the hooked rod E, and the staples $c$ $c'$, constructed and arranged substantially as described and shown.

ALBERT REASON.

Witnesses:
J. J. TEEPLE,
THOMPSON GRIMES.